(12) United States Patent
Kleiner et al.

(10) Patent No.: US 6,270,560 B1
(45) Date of Patent: Aug. 7, 2001

(54) FLAMEPROOF POLYMER MOULDING MATERIAL

(75) Inventors: Hans-Jerg Kleiner, Kronberg; Winfried Budzinsky, Bad Soden, both of (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/380,719

(22) PCT Filed: Mar. 2, 1998

(86) PCT No.: PCT/EP98/01152

§ 371 Date: Nov. 22, 1999

§ 102(e) Date: Nov. 22, 1999

(87) PCT Pub. No.: WO98/39381

PCT Pub. Date: Sep. 11, 1998

(30) Foreign Application Priority Data

Mar. 4, 1997 (DE) .............................................. 197 08 726

(51) Int. Cl.$^7$ ............................. C08K 5/00; C08L 67/00; C08L 77/00
(52) U.S. Cl. .................................. 106/18.14; 106/18.18; 252/600; 252/609; 523/506; 524/115; 524/121; 524/123; 524/126; 524/127
(58) Field of Search .................................. 252/600, 609; 106/18.14, 18.18; 523/506; 524/115, 121, 123, 126, 127

(56) References Cited

U.S. PATENT DOCUMENTS

| | | | |
|---|---|---|---|
| 3,594,347 | 7/1971 | Lazarus et al. | 524/135 |
| 3,892,998 | 7/1975 | Tsui et al. | 313/487 |
| 3,900,444 | 8/1975 | Racky et al. | 524/126 |
| 3,953,539 | 4/1976 | Kawase et al. | 524/116 |
| 4,036,811 | 7/1977 | Noetzel et al. | 524/126 |
| 4,049,612 | 9/1977 | Sandler | 348/640 |
| 4,078,016 | 3/1978 | Kramer | 524/126 |
| 4,180,495 | 12/1979 | Sandler | 524/135 |
| 4,208,321 | 6/1980 | Sandler | 525/420 |
| 4,208,322 | 6/1980 | Sandler | 525/434 |
| 4,957,950 | * 9/1990 | Staendeke et al. | 523/205 |
| 5,780,534 | 7/1998 | Kleiner et al. | 524/133 |

FOREIGN PATENT DOCUMENTS

| | | |
|---|---|---|
| 700 042 | 7/1967 | (BE) . |
| 2 102 841 | 8/1971 | (DE) . |
| 2 252 256 | 5/1974 | (DE) . |
| 2 252 258 | 5/1974 | (DE) . |
| 2 447 727 | 4/1976 | (DE) . |
| 2 915 116 | 10/1979 | (DE) . |
| 006 568 | 1/1980 | (EP) . |
| 2 827 867 | 1/1980 | (DE) . |
| 452 755 | 10/1991 | (EP) . |
| 458 067 | 11/1991 | (EP) . |
| 699 708 | 3/1996 | (EP) . |
| 794 191 | 9/1997 | (EP) . |
| 2 204 659 | 10/1972 | (FR) . |
| 2 422 698 | 4/1978 | (FR) . |

OTHER PUBLICATIONS

Derwent English Abstract (1971–52012S) for DE 2 102 841 (Aug. 5, 1971).
Derwent English Abstract (1974–C6071V) for DE 2 252 256 (May 9, 1974).
Derwent English Abstract (1974–34563V) for DE 2 252 258 (May 9, 1974).
Derwent English Abstract (1976–28565X) for De 2 447 727 (Apr. 8, 1976).
Derwent English Abstract (1979–59863B) for DE 2 915 116 (Oct. 25, 1979).
Derwent English Abstract (1980–02156C) for DE 2 827 867 (Jan. 17, 1980).
Derwent English Abstract (1980–02156C) for EP 006 568 (Jan. 9, 1980).
Derwent English Abstract (1991–312047) for EP 452 755 (Oct. 23, 1991).
Derwent English Abstract (1991–347511) for EP 458 067 (Nov. 27, 1991).
Derwent English Abstract (1996–130732) for EP 699 708 (Mar. 6, 1996).
Derwent English Abstract (1997–437433) for EP 794 191 (Sep. 10, 1997).
Derwent English Abstract (1974–34563V) for FR 2 204 659 (Oct. 25, 1972).
Derwent English Abstract (1979–59863B) for FR 2 422 698 (Apr. 13, 1978).
Derwent English Abstract (1976–42858X) for JP 51 047035 and JP 82 059262 (Apr. 22, 1976).
English Abstract for BE 700,042 (Jun. 18, 1966).

* cited by examiner

Primary Examiner—Anthony Green
(74) Attorney, Agent, or Firm—Connolly Bove Lodge & Hutz LLP

(57) ABSTRACT

Salt mixtures made from aluminum phosphinates, aluminum hydroxide and/or aluminum phosphonates and/or aluminum phosphates are thermally stable and are suitable as flame retardants for polymeric molding compositions, in particular for polyesters and polyamides. The use of these salt mixtures is more effective and more cost-effective than the use of aluminum phosphinates alone.

25 Claims, No Drawings

FLAMEPROOF POLYMER MOULDING MATERIAL

BACKGROUND OF THE INVENTION

1. Field of the Invention

The invention relates to flame-retardant polyester molding compositions and flame-retardant polyamide molding compositions which contain aluminum phosphinates, aluminum hydroxides and/or aluminum phosphonates and/or aluminum phosphates.

2. Description of the Prior Art

Polymers are frequently rendered flame-retardant by adding to them phosphorus-containing or halogen-containing compounds or mixtures of these. Some polymers are processed at high temperatures, e.g. at 250° C. or at higher temperatures. For this reason, many of the known flame retardants are not suitable for applications of this type, because they are too volatile or have insufficient thermal stability. Aluminum salts of phosphinic acids are thermally stable and have already been proposed as flame-retardant additives for polyesters and polyamides (EP-A-0 699 708). However, the phosphinic acids needed for their preparation are relatively expensive. For cost reasons, therefore, there is a need for polymeric molding compositions with phosphinates as flame retardants which can be produced at lower cost.

SUMMARY OF THE INVENTION

The invention relates to a polymeric molding composition which contains a phosphinate of the formula (I) and/or a diphosphinate of the formula (II) and/or polymers of these,

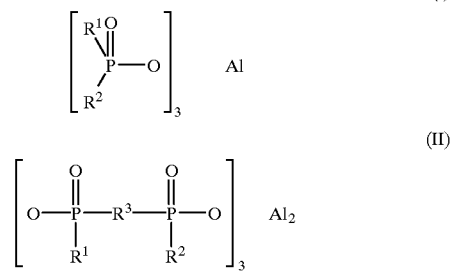

where $R^1$ and/or $R^2$ is $C_1$–$C_6$-alkyl, preferably $C_1$–$C_3$-alkyl, which may be linear or branched, e.g. methyl, ethyl, n-propyl, isopropyl, n-butyl or tert-butyl, where $R^1$ and $R^2$ may also be linked to a ring, and $R^3$ is $C_1$–$C_{10}$-alkylene, which may be linear or branched, e.g. methylene, ethylene, n-propylene, isopropylene, n-butylene, tert-butylene, n-pentylene, n-octylene, n-dodecylene or phenylene,
and also aluminum hydroxide and/or aluminum phosphate and/or aluminum phosphonate of the formula (III),

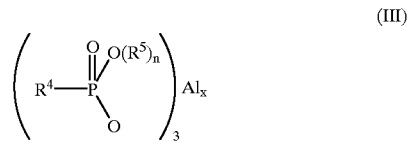

where $R^4$ is $C_1$–$C_6$-alkyl, preferably $C_1$–$C_3$-alkyl, which may be linear or branched, e.g. methyl, ethyl, n-propyl or isopropyl, $R^5$ is $C_1$–$C_3$-alkyl. preferably methyl, n is 0 or 1, and X is 1 if n is 1, and X is 2 if n is 0.

DESCRIPTION OF THE PREFERRED EMBODIMENTS

Polymeric compositions which may be mentioned are polyester molding compositions and polyamide molding compositions, in particular polyethylene terephthalate and polybutylene terephthalate. Examples of aluminum salts of phosphinic acids (aluminum phosphinates) are: aluminum salts from dimethylphosphinic acid, ethylmethylphosphinic acid, isopropylmethylphosphinic acid, methane-1,2-di(methylphosphinic acid) and benzene-1,4-(dimethylphosphinic acid), of 1-hydroxy-3-methyl-2,5-dihydro-1H-phosphole-1-oxide and of 1-hydroxy-2,5-dihydro-1H-phosphole-1-oxide. Examples of aluminum salts of phosphonic acids (aluminum phosphonates) are: an aluminum salt of monomethyl methanephosphonate, of monomethyl propanephosphonate, of methanephosphonic acid, of ethanephosphonic acid and of propanephosphonic acid.

The aluminum phosphinates and aluminum phosphonates may be prepared by known methods, by reacting the corresponding acids in aqueous solution with aluminum hydroxide.

The preparation of the salt mixtures according to the invention is likewise simple, and takes place by intensive mixing or grinding. However, in individual cases it may be advantageous to use specific methods of preparation. For example, a mixture of an aluminum salt of ethylmethylphosphinic acid and aluminum hydroxide in a weight ratio of about 70:30 is prepared by reacting ethylmethylphosphinic acid with aluminum hydroxide in a molar ratio of 1:1. It is possible moreover to prepare mixtures of the aluminum phosphinates with phosphonates and phosphoric acid by mixing the corresponding acids in the desired molar ratio and reacting with aluminum hydroxide in the appropriate molar ratio. For example, ethylmethylphosphinic acid and monomethyl methanephosphonate may be reacted in a weight ratio of 80:20 with appropriate stoichiometric amounts of aluminum hydroxide in glacial acetic acid as solvent, in accordance with German Patent Application 196 45 125.6.

The amounts of the salt mixtures to be added to the polymers may vary within wide limits. The amount used is generally from 5 to 35% by weight, based on the polymer, preferably from 10 to 25% by weight and in particular from 10 to 20% by weight. The ideal amount of the salt mixture depends on the nature of the polymer and on the type of salt mixture used, and may readily be determined by trials.

The ratio of the aluminum phosphinates to the other components of the salt mixture may likewise vary within wide limits. The amount of aluminum phosphinate used is generally about 50% by weight, preferably from 70 to 80% by weight, based on the salt mixture.

The salt mixtures are thermally stable do not decompose the polymers during processing and do not affect the process of preparing the polymeric molding composition. The salt mixtures are nonvolatile under the conditions of preparation and processing of polymers.

The salt mixtures according to the invention may be used in various physical forms, depending on the type of polymer used and the properties desired. For example, to achieve better dispersion in the polymer the salt mixtures may be ground to give fine particles.

The salt mixtures may be incorporated into the polymer by mixing both together and then melting the polymer in a compounding system (e.g. in a twin-screw extruder) and homogenizing the salt mixture in the polymer melt. The melt may be drawn off as extrudate, cooled and granulated. It is also possible to meter the salt mixture directly into the compounding system.

It is likewise possible to mix the flame-retardant additives into finished granules and to injection-mold directly, or to granulate after melting in an extruder and to process after drying.

The salt mixtures may also be added during the process of preparing the polymer.

Besides the salt mixtures, fillers and reinforcing materials such as glass fibers, or minerals such as chalk, may be added to the polymer. The products may contain other additives besides these, such as stabilizers, lubricants, colorants, fillers, nucleating agents and antistats.

EXAMPLE 1

7 parts of aluminum ethylmethylphosphinate and 3 carts of aluminum hydroxide were mixed well. Surprisingly, the mixture is stable when exposed to temperatures up to 285° C., above which noticeable elimination of water commences: in contrast, aluminum hydroxide begins to eliminate water from 200° C.

Compounds reinforced with 30% of glass fibers were prepared from the salt mixture and polybutylene terephthalate (PBT) without other additives, and test specimens of thickness 0.8 mm were injection-molded and tested with the following result:

| Concentration | UL 94 flammability classification |
|---|---|
| 20% | V-2 |

For comparison, aluminum ethylmethylphosphinate was used alone instead of the salt mixture. This comparison took place under the same conditions, but with a concentration of 14%. This corresponds to the same content of aluminum ethylmethylphosphinate as in a formulation containing 20% of the salt mixture mentioned above.

In the comparative experiment, the UL 94 flammability classification V-2 was not achieved.

EXAMPLE 2

7 parts of aluminum ethylmethylphosphinate and 3 parts of aluminum phosphate were mixed well. The mixture is stable when exposed to temperatures up to 360° C.

Compounds reinforced with 30% of glass fibers were prepared from this salt mixture and PBT without other additives, and test specimens of thickness 0.8 mm were injection-molded and tested with the following result:

| Concentration % | UL 94 flammability classification | Breaking stress N/mm$^2$ | Elongation at break % | Modulus of elasticity N/mm$^2$ |
|---|---|---|---|---|
| 20 | V-1 | 87.5 | 1.2 | 10741 |

For comparison, aluminum ethylmethylphosphinate was used alone. The comparison again took place under the same conditions and at a concentration of 14%.

| Concentration % | UL 94 flammability classification | Breaking stress N/mm$^2$ | Elongation at break % | Modulus of elasticity N/mm$^2$ |
|---|---|---|---|---|
| 14 | — | 116.3 | 1.8 | 11240 |

EXAMPLE 3

7 parts of aluminum ethylmethylphosphinate and 3 parts of aluminum monomethyl methanephosphonate were mixed well. Compounds reinforced with 30% of glass fibers were prepared from this salt mixture and PBT without further additives, and test specimens of thickness 0.8 mm were injection-molded and tested with the following result:

| Concentration % | UL 94 flammability classification | Breaking stress N/mm$^2$ | Elongation at break % | Modulus of elasticity N/mm$^2$ |
|---|---|---|---|---|
| 20 | V-0 | 96.1 | 1.2 | 11635 |

Experiment for comparison with Example 3

Aluminum monomethyl methanephosphonate was used to prepare, with PBT, compounds reinforced with 30% of glass fibers without other additives. Test specimens of thickness 0.8 mm were Injection-molded and tested with the following result:

| Concentration % | UL 94 flammability classification | Breaking stress N/mm$^2$ | Elongation at break % | Modulus of elasticity N/mm$^2$ |
|---|---|---|---|---|
| 20 | — | 53.7 | 0.6 | 10911 |

What is claimed is:

1. A flame-retardant molding composition, which comprises the following components a) a polymer, b) an aluminum phosphinate, polymer of the formula (I), an aluminum diphosphinate or a polymer of the formula (II):

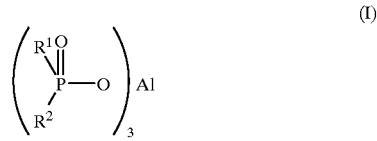

(I)

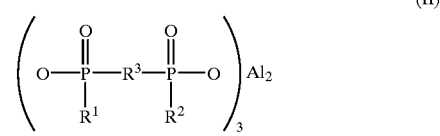

(II)

where $R^1$ and $R^2$, independently of each other, are $C_1$–$C_6$-alkyl, optionally linked to a ring, and
$R^3$ is $C_1$–$C_{10}$-alkylene, and c) aluminum phosphonate of the formula (III):

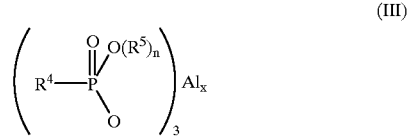

where $R^4$ is $C_1$–$C_6$-alkyl,
$R^5$ is $C_1$–$C_3$-alkyl,
n is 0 or 1,
x is 1 if n is 1, and
x is 2 if n is 0.

2. The flame-retardant molding composition as claimed in claim 1, wherein the polymer of component a) is a polyester or a polyamide.

3. The flame-retardant molding composition as claimed in claim 1, wherein the aluminum phosphinate or aluminum diphosphinate is an aluminum salt of dimethylphosphinic acid, an aluminum salt of ethylmethylphosphinic acid, an aluminum salt of isopropylmethylphosphinic acid, an aluminum salt of methane-1,2-di(methylphosphinic acid), an aluminum salt of benzene-1,4-(dimethylphosphinic acid), an aluminum salt of 1-hydroxy-3-methyl-2,5-dihydro-1H-phosphole-1-oxide, or an aluminum salt of 1-hydroxy-2,5-dihydro-1H-phosphole-1-oxide.

4. The flame-retardant molding composition as claimed in claim 1, wherein the aluminum phosphonate is an aluminum salt of monomethyl methanephosphonate, an aluminum salt of monomethyl propanephosphonate, an aluminum salt of methanephosphonic acid, an aluminum salt of ethanephosphonic acid, an aluminum salt of propanephosphonic acid, or a mixture thereof.

5. The flame-retardant molding composition as claimed in claim 1, wherein the aluminum compounds of components b and c are present in an amount of from 5 to 35% by weight, based on the weight of the polymer.

6. The flame-retardant molding composition as claimed in claim 1, wherein the aluminum phosphonate is present in an amount of 50% by weight or more, based on the total weight of the aluminum compounds of components b and c in the molding composition.

7. The flame-retardant molding composition as claimed in claim 1, further comprising an additive which is selected from the group consisting of a filler, a reinforcing material, a mineral, a stabilizer, a lubricant, a colorant, a nucleating agent, and an antistatic agent.

8. The flame-retardant molding composition as claimed in claim 7, wherein the additive is glass fibers.

9. The flame-retardant molding composition as claimed in claim 7, wherein the mineral is chalk.

10. The flame-retardant molding composition as claimed in claim 1, wherein $R^1$ and $R^2$, independently of each other, are methyl, ethyl, n-propyl, isopropyl, n-butyl, or tert-butyl groups.

11. The flame-retardant molding composition as claimed in claim 1, wherein $R^3$ is a methylene, ethylene, n-propylene, isopropylene, n-butylene, tert-butylene, n-pentylene, n-octylene, n-dodecylene or phenylene group.

12. The flame-retardant molding composition as claimed in claim 1, wherein $R^4$ is a methyl, ethyl, n-propyl or isopropyl group.

13. The flame-retardant molding composition as claimed in claim 1, wherein $R^5$ is a methyl group.

14. The flame-retardant molding composition as claimed in claim 2, wherein the polyester is polyethylene terephthalate or polybutylene terephthalate.

15. The flame-retardant molding composition as claimed in claim 5, wherein the aluminum compounds of components b and c are present in an amount of from 10 to 25% by weight, based on the weight of the polymer.

16. The flame-retardant molding composition as claimed in claim 15, wherein the aluminum compounds of components b and c are present in an amount of from 10 to 20% by weight, based on the weight of the polymer.

17. The flame-retardant molding composition as claimed in claim 6, wherein the aluminum phosphinate is present in an amount of from 70 to 80% by weight, based on the total weight of the aluminum compounds in the molding composition.

18. The flame-retardant molding composition as claimed in claim 3, wherein the polymer of component a) is polybutylene terephthalate, and the aluminum phosphinate or aluminum diphosphinate is an aluminum salt of ethylmethylphosphinic acid.

19. A flame-retardant molding composition, which comprises
a) a polymer selected from the group consisting of polyethylene, poly-butylene terephthalate and polyamide,
b) an aluminum phosphinate, polymer of the formula (I), an aluminum diphosphinate or a polymer of the formula (II):

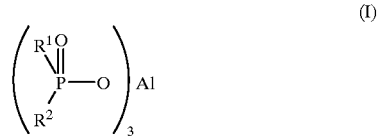

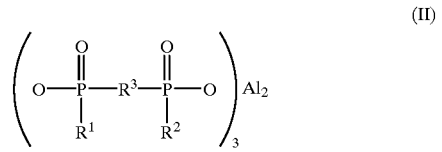

where $R^1$ and $R^2$, independently of each other, are $C_1$–$C_6$-alkyl, optionally linked to a ring, and
$R^3$ is $C_1$–$C_{10}$-alkylene, and
c) 5 to 35% by weight of aluminum hydroxide, based on the weight of the polymer.

20. The flame-retardant molding composition as claimed in claim 19, wherein the aluminum phosphinate or aluminum diphosphinate is an aluminum salt of dimethylphosphinic acid, an aluminum salt of ethylmethylphosphinic acid, an aluminum salt of isopropylmethylphosphinic acid, an aluminum salt of methane-1,2-di(methylphosphinic acid), an aluminum salt of benzene-1,4-(dimethylphosphinic acid), an aluminum salt of 1-hydroxy-3-methyl-2,5-dihydro-1H-phosphole-1-oxide, or an aluminum salt of 1-hydroxy-2,5-dihydro-1H-phosphole-1-oxide.

21. The flame-retardant molding composition as claimed in claim 19, wherein the aluminum phosphonate is an aluminum salt of monomethyl methanephosphonate, an aluminum salt of monomethyl propanephosphonate, an aluminum salt of methanephosphonic acid, an aluminum salt of ethanephosphonic acid, an aluminum salt of propanephosphonic acid, or a mixture thereof.

22. The flame-retardant molding composition as claimed in claim 19, further comprising an additive which is selected from the group consisting of a filler, a reinforcing material, a mineral, a stabilizer, a lubricant, a colorant, a nucleating agent, and an antistatic agent.

23. The flame-retardant molding composition as claimed in claim 19, wherein $R^1$ and $R^2$, independently of each other, are methyl, ethyl, n-propyl, isopropyl, n-butyl, or tert-butyl groups.

24. The flame-retardant molding composition as claimed in claim 19, wherein the aluminum compounds of components b and c are present in an amount of from 10 to 20% by weight, based on the weight of the polymer.

25. The flame-retardant molding composition as claimed in claim 19, wherein the polymer of component a) is polybutylene terephthalate, and the aluminum phosphinate or aluminum diphosphinate is an aluminum salt of ethylmethylphosphinic acid.

* * * * *

UNITED STATES PATENT AND TRADEMARK OFFICE
CERTIFICATE OF CORRECTION

PATENT NO. : 6,270,560 B1
DATED : August 7, 2001
INVENTOR(S) : Kleiner et al.

It is certified that error appears in the above-identified patent and that said Letters Patent is hereby corrected as shown below:

Title page,
OTHER PUBLICATIONS, "Derwent English Abstract (1976-28565X) for De 2 447 727 (April 8, 1976)" should read as -- Derwent English Abstract (1976-28565X) for DE 2 447 727 (April 8, 1976) --

Column 5, claim 1,
Line 1, "c) aluminum phosphonate of the formula (III):" should read as -- c) aluminum phosphate or aluminum phosphonate of the formula (III): --

Signed and Sealed this

Fifteenth Day of January, 2002

Attest:

Attesting Officer

JAMES E. ROGAN
Director of the United States Patent and Trademark Office